(12) United States Patent
Jelenic et al.

(10) Patent No.: US 6,608,146 B2
(45) Date of Patent: Aug. 19, 2003

(54) USE OF UNSATURATED DIACYL OR ACYLCARBONATE PEROXIDES IN CROSS-LINKING PROCESSES

(75) Inventors: Jernej Jelenic, Schalkhaar (NL); Charles Manuel Navarro, Twello (NL); John Meijer, Deventer (NL)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 09/741,226

(22) Filed: Dec. 20, 2000

(65) Prior Publication Data

US 2001/0044504 A1 Nov. 22, 2001

Related U.S. Application Data

(60) Provisional application No. 60/176,593, filed on Jan. 18, 2000.

(30) Foreign Application Priority Data

Dec. 22, 1999 (EP) .............................. 99204463

(51) Int. Cl.$^7$ .................................. C08F 8/06
(52) U.S. Cl. ..................... 525/387; 528/24; 560/302; 525/474; 525/451
(58) Field of Search .............. 528/24; 525/387, 525/474, 451; 560/302

(56) References Cited

U.S. PATENT DOCUMENTS

| | | | |
|---|---|---|---|
| 4,372,877 A | 2/1983 | Peterson | 260/453 RZ |
| 4,743,671 A | 5/1988 | Dorn et al. | 528/24 |
| 4,771,099 A | 9/1988 | Itoh et al. | 524/862 |
| 5,061,276 A * | 10/1991 | Tu et al. | |
| 5,391,619 A * | 2/1995 | Hanes | |
| 5,770,670 A | 6/1998 | Vertommen et al. | 526/328 |

FOREIGN PATENT DOCUMENTS

| | | | |
|---|---|---|---|
| DE | 1 932 475 | 7/1970 | C08G/47/06 |
| EP | 0 208 353 | 1/1987 | C08K/5/14 |
| EP | 0 219 900 | 4/1987 | C07C/179/18 |
| EP | 0 235 537 | 9/1987 | C08K/5/14 |
| EP | 0 282 130 | 9/1988 | C08K/5/14 |
| EP | 0 667 339 | 8/1995 | C07C/409/20 |
| EP | 0 801 111 | 10/1997 | C08L/83/04 |
| EP | 0 896 982 | 2/1999 | C08L/23/16 |
| EP | 0 939 103 | 9/1999 | C08K/13/02 |
| GB | 1018364 | 1/1966 | |
| GB | 1 270 942 | 4/1972 | C08G/47/06 |
| JP | 11-246613 | 9/1999 | C08F/4/38 |

OTHER PUBLICATIONS

Sako Takahiro, *Heat–Curable Silicone Rubber Composition And Molding Of Silicone Rubber, Patent Abstracts of Japan,* 10046030, dated Feb. 17, 1998.
International Search Report for PCT/EP00/12452.

* cited by examiner

Primary Examiner—Robert Dawson
Assistant Examiner—Kim-Liang Peng
(74) Attorney, Agent, or Firm—Richard P. Fennelly

(57) ABSTRACT

The invention relates to curing process wherein specific unsaturated diacyl-peroxides and/or unsaturated acylperoxycarbonates are used. These peroxides were found to be pre-eminently suited to the curing of silicone rubbers and polyester resins. Their use does not lead to blooming, bad smell and/or discoloration of the cured product, while allowing low residual monomer levels to be obtained at processing temperatures below the temperature used in conventional processes wherein peroxyesters are used.

13 Claims, No Drawings

USE OF UNSATURATED DIACYL OR ACYLCARBONATE PEROXIDES IN CROSS-LINKING PROCESSES

This application claims priority of European Patent Application No. 99204463.6, filed Dec. 22, 1999 and benefit of U.S. patent application Ser. No. 60/176,593, filed Jan. 18, 2000.

The present invention relates to the use of unsaturated peroxides in cross-linking processes, such as the cross-linking of silicone rubbers and the curing of unsaturated polyester resins.

The use of peroxides for the radical cross-linking of silicone rubbers is well-known, particularly for use in hot air vulcanization systems. Typically, products like bis(2,4-dichlorobenzoyl) peroxide, bis (p-chlorobenzoyl) peroxide, 2,5-di-tert-butylperoxy hexane, tert-butyl cumyl peroxide, dicumyl peroxide, and di-tert-butyl peroxide were used. All of these products are known to result in blooming of low-molecular weight products or smell, the latter probably given off by decomposition products of the peroxide, which is highly undesired. Although a temperature treatment of the cross-linked silicone rubber may (partially) prevent blooming from occurring, because the low-molecular weight products are stripped away, such a treatment is undesired, since it is energy consuming and may lead to discolouration of the cured material.

In EP-A-0 282 130 it is disclosed to use bis(2-fluorobenzoyl) peroxide for the cross-linking of a silicone rubber in order to attain a good curing rate and to prevent decomposition products from blooming. Similarly, EP-A-0 235 537 proposes to use specific bis(4-alkylbenzoyl) peroxides for the cross-linking of silicone rubber. These bis(4-alkylbenzoyl) peroxides are said to give stable dispersions when formulated with silicone oils and not to result in discolouration of the cross-linked silicone rubber even when the dispersions have been stored for a prolonged period. However, the nature of these peroxides—they all have a dibenzoyl peroxide skeleton—inherently leads to the formation of aromatic decomposition products. Such products are undesired, since they are known to result in a bad smell of the cured product. DE-A-1 932 475 teaches to use tert-butylperoxy crotonate for the vulcanization of carbon black-filled organosiloxanes. However, the use of tert-butylperoxy crotonate was found to result in a silicone rubber with unacceptable properties, especially when cross-linking occurred at lower temperatures (below 150° C.).

For the radical curing/cross-linking of unsaturated polyester resins many peroxides are used, the selection typically being dependent on, inter alia, the composition of the formulation, processing temperatures, the desired reaction times, and residual monomer levels. For processes which are conducted at higher temperatures (>70° C.) very often di(4-tert-butylcyclohexylperoxy) peroxydicarbonate is used to get a quick gelation of the formulation. However, the product is not readily soluble in the unsaturated polyester resin and its use results in high residual styrene levels in the cured resin. Another frequently used peroxide is tert-butylperoxy benzoate. This peroxide, when used alone, leads to acceptably low residual styrene levels at curing temperatures above 110° C., but its use often results in too long gel times and it also contains the undesired benzoyl moiety, leading to benzene formation upon decomposition. A combination of di(4-tert-butylcyclohexyl) peroxydicarbonate and tert-butyl peroxybenzoate, which is known to be used, renders a system with acceptable gelation times and residual monomer levels. However, such a combination also suffers from the solubility and decomposition product problem. Many other combinations of peroxides have been proposed for use as cross-linking initiating systems. However, the use of combinations of peroxides is undesired since storage of two or more types of peroxides, typically with different storage temperature requirements, is troublesome and because handling and mixing is more time-consuming and metering a source of errors.

Therefore, there has been a continued search for alternatives and improved products for use in the field of cross-linking processes. More particularly, the industry is in need of new types of initiators that will give an effective cure of silicone rubbers and unsaturated polyester resins, comparable with the curing of conventional peroxides, but do not suffer from blooming, bad smell, solubility problems, and the like. Preferably, the alternatives can be used at conventional lower temperatures of up to 160° C. Also they are preferably used as the sole initiator, without that it is needed to combine them with other initiators.

Surprisingly, we have found that specific peroxides according to the invention can be used to fulfill this need. The specific peroxides are characterized by the formula

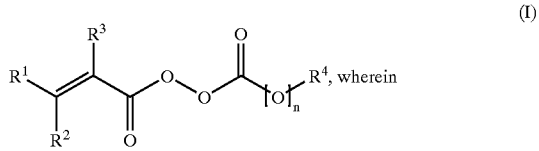

(I)

n=0 or 1, $R^1$, $R^2$, and $R^3$ are independently selected from the group consisting of hydrogen, $C_1$–$C_{20}$ alkyl, $C_2$–$C_{20}$ alkenyl, $C_2$–$C_{20}$ alkynyl, $C_3$–$C_{20}$ cycloalkyl, $C_3$–$C_{20}$ cycloalkenyl, $C_6$–$C_{20}$ aryl, $C_7$–$C_{20}$ aralkyl, and $C_7$–$C_{20}$ alkaryl, which groups may include linear or branched alkyl moieties and which optionally are substituted with one or more groups selected from hydroxy, alkoxy, linear or branched polyalkyloxy, aryloxy, halogen, ester, ketone, carboxy, nitrile, and amido. Any pair of $R^1$–$R^2$, $R^1$–$R^3$, and $R^2$–$R^3$ may be linked to form a cyclic structure. $R^1$, $R^2$, and $R^3$ may also be linked to form a polycyclic structure, and $R^4$ is selected from the group of radicals consisting of $C_1$–$C_{20}$ alkyl, $C_2$–$C_{20}$ alkenyl, $C_2$–$C_{20}$ alkynyl, $C_3$–$C_{20}$ cycloalkyl, $C_3$–$C_{20}$ cycloalkenyl, $C_6$–$C_{20}$ aryl, $C_7$–$C_{20}$ aralkyl, and $C_7$–$C_{20}$ alkaryl, which groups may include linear or branched alkyl moieties and which optionally are substituted with one or more groups selected from hydroxy, alkoxy, linear or branched polyalkyloxy, aryloxy, halogen, ester, ketone, carboxy, nitrile, and amido, and radicals of formulae II and III,

(II)

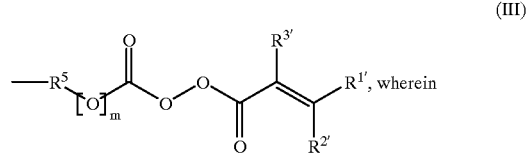

(III)

m=0 or 1, $R^5$ is selected from $C_{1-20}$ alkylene, $C_{1-20}$ polyoxyalkylene, $C_{2-20}$ alkenylene, $C_{2-20}$ polyoxyalkenylene, $C_2$–$C_{20}$ alkynylene, $C_{2-20}$ polyoxyalkynylene, $C_3$–$C_{20}$ cycloalkylene, $C_3$–$C_{20}$ cycloalkenylene, $C_6$–$C_{20}$ arylene, $C_{7-20}$ aralkylene, and $C_{7-20}$ aralkenylene groups, which groups may include linear or branched alkyl moieties and all of which may optionally contain one or more hetero atoms, and wherein $R^6$, $R^7$, $R^8$, and $R^{1'}$, $R^{2'}$, $R^{3'}$ are independently selected from the group consisting of compounds according to the definition of $R^1$, $R^2$, and $R^3$, respectively.

Preferably, $R^1$, $R^2$, $R^3$, $R^{1'}$, $R^{2'}$, $R^{3'}$, $R^6$, $R^7$, and $R^8$ are independently selected from the group comprising hydrogen, methyl, ethyl, propyl, isopropyl, butyl, tert-butyl, pentyl, hexyl, heptyl, nonyl, and phenyl. The various R groups can be varied in such a way that a product with the desired properties is obtained, e.g. a certain melting point/range. Alternatively, mixtures of peroxides of formula I can be used that have the desired properties.

More preferably $R^1$, $R^2$, $R^3$, $R^{1'}$, $R^{2'}$, $R^{3'}$, $R^6$, $R^7$, and $R^8$ are selected such that one or more of the following moieties is formed:

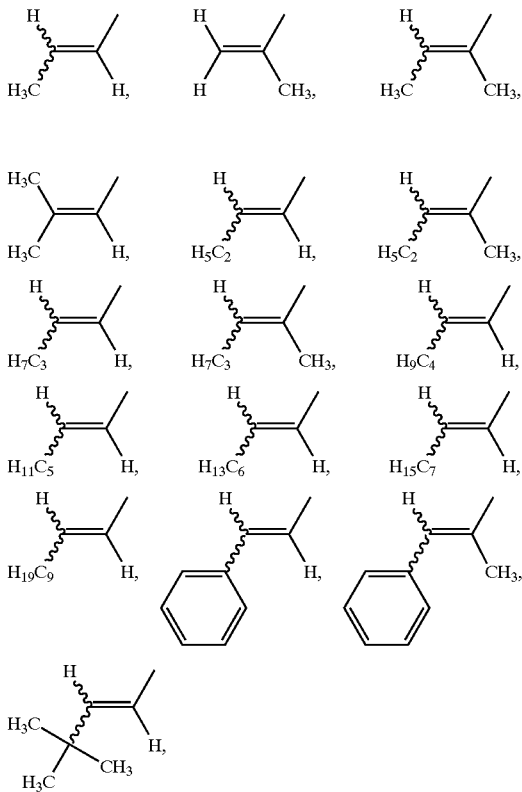

$H_3C$—CH=CH—CH=CH— (any isomer), and Alkyl—O—CO—CH=CH— (any isomer).

$R^5$ preferably is —C=C—C=C— (the residue of muconic acid) when n and m are 0, and $C_{2-12}$ alkylene or $C_{2-12}$ polyoxyalkylene, when both m and n are 1.

More preferred peroxides for use in the curing process of the present invention are:

di-2-butenoyl peroxide (all isomers)
di-2-methyl-2-butenoyl peroxide (all isomers)
di-3-methyl-2-butenoyl peroxide (all isomers)
(Z,Z')-bis(4-butoxy-4-oxo-2-butenoyl) peroxide
di-2-butenoyl muconoyl peroxide of formula

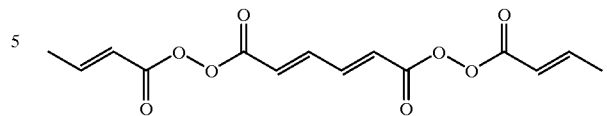

2-butenoyl peroxy alkylcarbonates, of formula

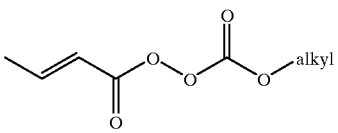

and
di (2-butenoylperoxy) alkylenedicarbonates, such as

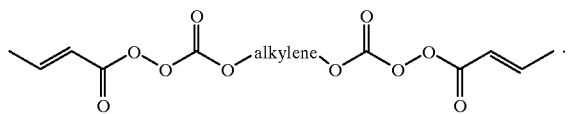

The peroxides of the invention can be produced in conventional ways by reacting the appropriate acid chloride(s), chloroformate, (mixed) anhydride, or the like, with sodium peroxide. How to use mixed anhydrides in the process to make the unsaturated peroxides is explained in more detail in non-prepublished PCT patent application PCT/EP00/09927.

Depending on the peroxide in question, it is possible that it can be used in the pure form. However, because of safety and/or handling considerations, it can be preferred to formulate the peroxide in an acceptable manner. Accordingly, when speaking of peroxide in this document, such term is considered to encompass the pure peroxide as well as any formulation thereof. Examples of suitable formulations are solutions, pastes, and/or dispersions of the peroxide in a conventional phlegmatizers, or powders, granulates or masterbatches as obtainable by combining any of the pure peroxides, solutions, pastes, and/or dispersions with a conventional carrier material. If a paste of a solid peroxide is used, it is preferred that the peroxide particles have an average particle size less than 50 $\mu$m, preferably less than 30 $\mu$m, for the reasons as presented in EP-A-0 939 103. Furthermore, it is preferred that such pastes are dispersions of the peroxide in a silicone oil or low molecular weight polysiloxane. Powdery formulations preferably contain conventional inert fillers, such as silica, calcium carbonate, kaolin, and the like. Masterbatch formulations comprise the peroxide and an inert polymer or rubber that is compatible with silicone rubber. Preferably, peroxide masterbatches for use in silicone rubber curing comprise a silicone rubber. If so desired, granulates and masterbatches may also comprise fillers and or liquid phlegmatizers.

The peroxides of the invention are preferably used in curing processes that are conducted at a temperature from 50 to 250° C. More preferably, the curing process is conducted at a temperature from 70 to 200° C., and most preferably at a temperature from 80 to 150° C. Where the heat transfer coefficient with the processing equipment is poor, such as in hot air curing processes, or in unsaturated polyester mouldings with a thickness of over 5 mm, the peak exotherm that is observed on the inside or the outside of the product being cured may be higher. The curing temperature, therefore, is the average temperature of the whole of the product being cured over the total curing time.

The term "silicone rubber" as used throughout this document is meant to designate any compositions comprising an organopolysiloxane. The polysiloxanes are typically based on dimethyl polysiloxane, dimethylphenyl polysiloxane and/or copolymers of these polysiloxanes and typically have a molecular weight ranging from 5,000 up to 750,000 Dalton. They may comprise monomeric units of the structure

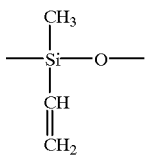

and/or

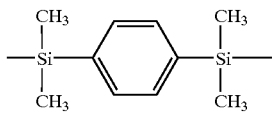

and/or

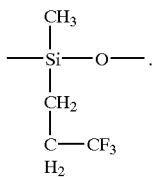

They may be blocked, random and/or terpolymers. For a further description reference is made to W. Hofmann, *Rubber Technology Handbook*, ISBN 3-446-14895-7 Hanser Publishers, pp 129–136. The silicone rubber may contain conventional additives. Typical additives that are used in silicone rubbers include reinforcing fillers, such as silica; pigments; stabilisers; plasticizers, such as silicone oils or uncured silicone rubber; and products like methyl hydrogen polysiloxane. If so desired, one or more of these additives may be used in making a peroxide formulation according to the invention.

The cured silicone rubbers can be used in a variety of applications, including electrical, electronic, automotive, textile, and pharmaceutical/medical components.

The more preferred peroxides for use in the process to cure silicone rubbers are (substituted) 2-butenoyl alkanoyl peroxides, (substituted) 2-butenoyl alkenoyl peroxides, (substituted) 2-butenoyl peroxy alkylcarbonates, and di-(substituted)-(2-butenoylperoxy) alkylene(oxy) dicarbonates. Most preferred peroxides in this process are di(2-butenoyl) peroxide and di(2-butenoylperoxy) hexylenedicarbonate. For curing silicone rubbers it can be advantageous to combine one or more of the peroxides of the invention with one or more conventional peroxides. If a combination of peroxides (pure or formulated) is used, they may be added separately to the silicone rubber, or be used in a premixed form. If so desired, trace amounts of platinum can be used together with the peroxide, as described in, for instance, EP-B-0 801 111.

The term "unsaturated polyester resin" is meant to encompass any conventional curable unsaturated polyester compound, as well-known in the art, including those systems wherein unsaturated vinyl esters are used. Typically, the polyester or unsaturated vinyl ester is combined with one or more polymerizable monomers together with further optional additives to make the unsaturated polyester resin.

Conventional vinyl esters, as well-known in the art, typically are compounds comprising a —C(O)—OCH$_2$CH (OH)CH$_2$O— moiety and terminal, polymerizable vinylidene groups. Typical vinyl ester resins include the reaction products of dicarboxylic acid half esters of hydroxy (meth)acrylates and polyepoxide resins, the reaction products of glycidyl(meth)acrylates and salts of polyols, and the reaction products of (meth)acrylic acid and epoxy novolac resins. The polyepoxides typically are the glycidyl polyethers of polyols, including polyhydric phenols.

Conventional unsaturated polyesters, as well-known in the art, typically are the condensation products of unsaturated hydroxyacids, the reaction products of carboxylic acids with two or more acid groups, or anhydrides, and polyols having two or more hydroxyl groups per molecule, or the reaction products of a mixture of hydroxyacids, carboxylic acids, and polyols. By a proper selection of raw materials, the desired unsaturation of the resulting resin is obtained.

Suitable monomers are of the conventional type and include, but are not limited to, styrene, vinyl toluene, divinyl benzene, (meth)acrylic acid esters, vinyl acetate, diallylmaleate, and dimethallyl fumarate.

The unsaturated polyester resin is typically cured to form a cross-linked product (a thermoset) by means of a radical polymerization process. Depending on the temperature at which the resin is to be cured, various peroxides are known to be used, optionally together with accelerators and optionally in a redox system. In the unsaturated polyester resin curing process of the invention, at least one peroxide is used satisfying the definition given in claim 1. The most preferred peroxides for use in the curing process of unsaturated polyester resins are di-2-butenoyl peroxide (all isomers) and di-3-methyl-2-butenoyl peroxide (all isomers).

Experimental

Di(2-butenoyl) peroxide was prepared using the following procedure: 0.20 mol trans-crotonyl chloride was dropped (in 50 min.) into a solution of 0.115 mol sodium peroxide in water. The temperature was kept at 0–10° C. and the pH was maintained at a value of about 10 by addition of sodium hydroxide (25% in water). After addition of the crotonyl chloride, the mixture was post-reacted for 40 minutes at 10° C. Thereafter, the product was extracted with 50 ml diethylether. The organic layer was washed three times with a 25% solution of sodium chloride in water, dried with magnesium sulfate, filtered, and concentrated in vacuum to yield 5 grams of peroxide of 75% purity.

Perkadox® PD-50Sps=Di(2,4-dichlorobenzoyl) peroxide, ex Akzo Nobel

Perkadox® PM-50Sps=Di(4-methylbenzoyl) peroxide, ex Akzo Nobel

Sioprene® HV3/611U (silicone rubber), ex Bayer

Sioprene® HV3/711U (silicone rubber), ex Bayer

In the examples where silicone rubber is cured, the peroxides and silicone rubber were first mixed using a two-roll mill, Dr. Collin, at room temperature (about 25° C.) to form mixed compositions. The mixing on the two-roll mill occurred without the incorporation/formation of voids in the compound.

The curing characteristics of the mixed compositions were determined using a Monsanto Rheometer® MDR 2000E. The temperature was varied, depending on the half-life of peroxide(s) used.

Values for ts2 (scorch time in minutes), t90 (cure time in minutes), and the delta TQ (increase of torque during curing in Nm) were recorded.

The mixed compositions were pressed into a sheet-type form using a stainless steel 316 mould with dimensions 105×180×2 mm using a Fonteyne press. The sheets were cured either by compression moulding, using the same press and mould, at 110° C. for 15 minutes, or by hot air curing the sheet in a Heraeus circulation air oven at 200° C. for 6 hours.

The tensile properties of the cured sheets were determined in accordance with ISO 37-'77, using a Zwick tensile tester.

The compression set of a cured rubber sheet was determined in accordance with ISO 815-'91 at 175° C. for 24 hours.

Blooming was determined visually.

The curing of polyester resins was performed in accordance with method F 77.1 as published by the Society of Plastic Institute. Time-temperature curves were measured at 100° C. on compounds containing 100 parts of a standard polyester resin (Ludopal® P6, ex BASF), 150 parts of conventional sand with a particle size of 02–0.63 mm, ex Sibelko (as a filler), and the required peroxides. The peroxide amount was adjusted such that it equated, on active oxygen (Act. O) basis, to 1 part by weight of tert-butyl peroxybenzoate (Trigonox® C ex Akzo Nobel). In the test 25 g of compound are poured into a test tube and a thermocouple is mounted through the enclosure cork at the centre of the tube. The glass tube is then placed in the oil bath maintained at the test temperature and the time-temperature curve is measured. From the curve the following parameters were calculated:

Gel time (GT)=time in minutes elapsed between 16.7° C. below and 5.6° C. above the bath temperature.

Time to peak exotherm (TTP)=time elapsed between the start of the experiment and the moment that the peak temperature is reached.

Peak exotherm (PE)=the maximum temperature which is reached.

The residual styrene level was determined by conventional GC techniques after dissolving the sample in dichloromethane.

EXAMPLE 1 AND COMPARATIVE EXAMPLES A–B

A peroxide as presented in Table 1 was mixed with 100 g of type Siloprene® HV3/611U silicone rubber, ex Bayer. The data on the cure in the rheometer and the physical properties of compression moulded cured material are given in Table 1. The compression moulded cured product was analyzed for blooming and smell.

As can be derived from the table, the peroxide of the invention can be used so that the curing properties are comparable to those of the conventionally used bis(2,4-dichlorobenzoyl) peroxide. However, it is clear that the products of the prior art result in blooming and/or a bad smell, which phenomena are not observed if a peroxide according to the invention is used.

EXAMPLES 2–4 AND COMPARATIVE EXAMPLE C

The previous examples were repeated in a second set of experiments. The peroxides that were used and the results are compiled in Table 2.

Again it is observed that the peroxides of the invention can be used such that the curing characteristics and physical properties of the silicone rubber are about equal to the curing characteristics and physical properties of conventionally cured silicone rubber. The advantage that the products of the invention clearly have is that the resulting cured silicone rubber does not suffer from blooming and/or a bad smell.

Example 3 is a duplicate of Example 1 and shows that many of the differences that occur in the curing characteristics of the silicone rubber and the mechanical properties of the compression moulded silicone rubber are within experimental error.

EXAMPLES 5–7 AND COMPARATIVE EXAMPLES D

In these examples, Examples 2–4 and Comparative Example C were repeated, except that the silicone rubber was cured by hot air.

The results are presented in Table 3. Most of the physical properties of the cured rubber are very similar. Also, the use of peroxides according to the invention results in the same or less colour formation compared to when the conventional bis(2,4-dichlorobenzoyl) peroxide is used. However, probably due to the structure of the peroxides, they were found not to lead to smell and/or blooming problems.

EXAMPLES 8–10 AND COMPARATIVE EXAMPLES E–H

In these examples, Example 1 was repeated, except that another silicone rubber, viz. Siloprene® HV3/711U, was used and the peroxide used to initiate the cure was varied. The di(2-butenoylperoxy) hexylenedicarbonate was produced in a conventional way by dosing a mixture of trans-crotonoylchloride and hexane-1,6-chloroformate to an aqueous $Na_2O_2$ solution at pH 11.

The results are presented in Table 4. From the data it is clear that using the peroxides of the invention can result in curing characteristics that are similar to those observed when a conventional peroxide like bis(2,4-dichlorobenzoyl) peroxide is used. Also it is shown that peroxyesters, even unsaturated peroxyesters, require the use of temperatures of 160° C., even in this process where the heat transfer coefficient is high (due to intimate mixing in the rheometer).

TABLE 1

Curing characteristics and tensile properties of compression moulded cured silicone rubber (VMQ)

| Example | Peroxide | Peroxide Dosing Phr* | Peroxide Dosing mmol | Monsanto Rheometer (110° C.) Ts2 (min) | Monsanto Rheometer (110° C.) T90 (min) | Monsanto Rheometer (110° C.) Delta TQ (N/m) | Tensile Properties Compression moulding TS (Mpa) | Tensile Properties Compression moulding Mod. 100% (Mpa) | Tensile Properties Compression moulding Mod. 300% (MPa) | EB (%) | Blooming Visual | Blooming Smell |
|---|---|---|---|---|---|---|---|---|---|---|---|---|
| 1 | Di(2-butenoyl) peroxide | 0.52 | 3 | 0.44 | 2.48 | 1.03 | 9.8 | 1.05 | 2.54 | 520 | None | None |
| A1 | Perkadox PD-50Sps | 1.45 | 1.9 | 0.49 | 1.68 | 1.07 | 10.9 | 1.29 | 3.13 | 480 | Yes | Slight |
| A2 | Perkadox PD-50Sps | 2.28 | 3 | 0.41 | 1.62 | 1.16 | 10.6 | 1.34 | 3.38 | 430 | Yes | Slight |
| B | Perkadox PM-50Sps | 1.62 | 3 | 1.58 | 7.54 | 0.96 | 10.8 | 1.08 | 2.61 | 500 | None | Yes |

*Phr = parts by weight peroxide per hundred parts of silicone rubber

TABLE 2

Curing characteristics and tensile properties of compression moulded cured silicone rubber

| Example | Peroxide | Peroxide Dosing Phr | Peroxide Dosing mmol | Monsanto Rheometer (110° C.) Ts2 (min) | Monsanto Rheometer (110° C.) T90 (min) | Monsanto Rheometer (110° C.) Delta TQ (N/m) | Tensile Properties Compression moulding TS (Mpa) | Tensile Properties Compression moulding Mod. 100% (Mpa) | Tensile Properties Compression moulding Mod. 300% (MPa) | EB (%) | Blooming Visual | Blooming Smell |
|---|---|---|---|---|---|---|---|---|---|---|---|---|
| 2 | Di(2-butenoyl) Peroxide | 0.35 | 2 | 0.64 | 3.21 | 0.86 | 11.0 | 0.99 | 2.28 | 590 | None | None |
| 3 | Di(2-butenoyl) peroxide | 0.52 | 3 | 0.49 | 2.76 | 1.04 | 11.2 | 1.31 | 3.26 | 520 | None | None |
| 4 | Di(2-butenoyl) peroxide | 0.69 | 4 | 0.43 | 2.55 | 1.13 | 9.7 | 1.45 | 3.79 | 430 | None | None |
| C1 | Perkadox PD-50Sps | 0.96 | 1.3 | 0.64 | 2.19 | 0.98 | 12.1 | 1.03 | 2.36 | 570 | Yes | Slight |
| C2 | Perkadox PD 50Sps | 1.52 | 2 | 0.49 | 1.72 | 1.11 | 10.6 | 1.28 | 3.11 | 460 | Yes | Slight |

TABLE 3

Mechanical properties of hot air cured silicone rubber

| Example | Peroxide | Peroxide Dosing Phr | Peroxide Dosing Mmol | Tensile Properties Hot air curing, 6 h 200° C. TS (MPa) | Tensile Properties Hot air curing, 6 h 200° C. Mod. 100% (MPa) | Tensile Properties Hot air curing, 6 h 200° C. Mod. 300% (Mpa) | Tensile Properties Hot air curing, 6 h 200° C. EB (%) | Compression set 24 h., 175° C./% curing 15 min., 110° C. | Voids Visual | Colour 1(yellow) 8(brown) |
|---|---|---|---|---|---|---|---|---|---|---|
| 5 | Di(2-butenoyl) peroxide | 0.35 | 2 | 9.2 | 0.88 | 2.05 | 610 | 51 | None | 4 |
| 6 | Di(2-butenoyl) peroxide | 0.52 | 3 | 9.6 | 1.13 | 2.87 | 530 | 51 | None | 4 |
| 7 | Di(2-butenoyl) peroxide | 0.69 | 4 | 9.1 | 1.31 | 3.46 | 450 | 49 | None | 4 |
| D1 | Perkadox PD-50Sps | 0.96 | 1.3 | 11.5 | 1.05 | 2.36 | 610 | 32 | None | 5 |
| D2 | Perkadox PD-50Sps | 1.52 | 2 | 10.2 | 1.34 | 3.22 | 470 | n.d.* | None | 4 |

*n.d. = not determined

TABLE 4

Curing data of Silopren ® HV3/711U

| | | Peroxide Dosing | | Curing | Monsanto Rheometer | | |
|---|---|---|---|---|---|---|---|
| | | | | | Ts2 | T90 | Delta TQ |
| Example | Peroxide | Phr | mmol | (° C.) | (min) | (min) | (N/m) |
| 8 | (Z,Z)-Bis(4-butoxy-4-oxo-2-butenoyl) peroxide | 1.13 | 3 | 120 | 0.54 | 2.31 | 0.64 |
| 9 | Di(2-butenoyl) peroxide | 0.52 | 3 | 110 | 0.45 | 3.03 | 1.57 |
| 10 | Di(2-butenoylperoxy) hexylenedicarbonate | 1.6 | 3 | 120 | 0.33 | 1.99 | 0.76 |
| E | Perkadox PD-50Sps | 2.3 | 3 | 110 | 0.35 | 1.49 | 1.99 |
| F | Tert-butylperoxy (2,4-hexadienoate) | 0.66 | 3 | 160 | 0.46 | 3.44 | 0.83 |
| G | Di-tert-butylperoxy muconate | 0.88 | 3 | 160 | 0.29 | 2.29 | 1.27 |
| H | Tert-amylperoxy 2-butenoate | 0.58 | 3 | 160 | 0.35 | 1.63 | 1.36 |

EXAMPLES 11 AND 12 AND COMPARATIVE EXAMPLES I–K

Unsaturated polyester resins were cured at 100° C. in accordance with the procedure given above. In Examples 11 and 12 di(3-methyl-2-butenoyl)peroxide and di(2-butenoyl) peroxide were used, respectively, and in Comparative Examples I–K tert-butyl peroxybenzoate (Trigonox® C), bis(4-tert-butylcyclohexyl) peroxydicarbonate (Perkadox® 16), and a mixture of tert-butyl peroxybenzoate and bis(4-tert-butylcyclohexyl) peroxydicarbonate (in a weight ratio of 2:1) were used, respectively. The result are summarized in the table below:

| Example | Act. O (%) | GT (min) | TTP (min) | PE (° C.) | Residual styrene (%) |
|---|---|---|---|---|---|
| I | 8.0 | 6.97 | 13.68 | 141 | 0.922 |
| J | 3.9 | 0.08 | 1.78 | 166 | 0.85 |
| K | 6.6 | 0.33 | 2.65 | 178 | 0.13 |
| 11 | 7.84 | 0.2 | 2.38 | 177 | 0.05 |
| 12 | 8.55 | 0.43 | 2.92 | 197 | 0.04 |

These results show that at elevated curing temperatures (>70° C.) the use of Perkadox® 16 results in the expected quick gelation but also leads to undesirably high residual styrene levels. Also, the Perkadox® 16 did not dissolve readily in the unsaturated polyester resin. The use of Trigonox® C did not give a quick gelation, and some of the decomposition products are aromatic in nature. The combination of Perkadox® 16 with Trigonox® C resulted in an acceptable GT and a lower residual styrene level. However, there were still dissolving problems and aromatic decomposition products. The use of di(3-methyl-2-butenoyl) peroxide and di(2-butenoyl)peroxide according to the invention not only showed acceptable gelation but also resulted in very low residual styrene levels, while the peroxides dissolved very rapidly in the unsaturated polyester resin and did not give rise to the formation of aromatic decomposition products. Moreover, the peroxides offer the advantage of being a single peroxide initiator system.

What is claimed is:

1. A process of curing a polymer, other than a blend of poly(ethylene terephthalate) and a monovinylarene/cojugated diene block copolymer, wherein an organic peroxide is used as a source of free radicals, characterized in that at least one organic peroxide is selected from the group consisting of peroxides according to formula

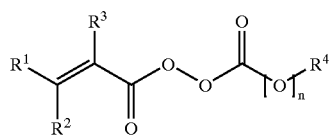

(I)

and mixtures thereof, wherein n=0 or 1, $R^1$, $R^2$, and $R^3$ are independently selected from a first group consisting of hydrogen, $C_1$–$C_{20}$ alkyl, $C_2$–$C_{20}$ alkenyl, $C_2$–$C_{20}$ alkynyl, $C_3$–$C_{20}$ cycloalkyl, $C_3$–$C_{20}$ cycloalkenyl, $C_6$–$C_{20}$ aryl, $C_7$–$C_{20}$ aralkyl, and $C_7$–$C_{20}$ alkaryl, wherein the first group may include linear or branched alkyl moieties and which optionally are substituted with one or more groups selected from hydroxy, alkoxy, linear or branched polyalkyloxy aryloxy, halogen, ester, ketone, carboxy, nitrile, and amido, where any pair of $R^{1-R2}$, $R^{1-R3}$, and $R^{2-R3}$ may be linked to form a cyclic structure and $R^1$, $R^2$, and $R^3$ may also be linked to form a polycyclic structure, and $R^4$ is selected from a second group of radicals consisting of $C_1$–$C_{20}$ alkyl, $C_1$–$C_{20}$ alkenyl, $C_2$–$C_{20}$ alkynyl, $C_3$–$C_{20}$ cycloalkyl, $C_3$–$C_{20}$ cycloalkenyl $C_6$–$C_{20}$ aryl, $C_7$–$C_{20}$ aralkyl, and $C_7$–$C_{20}$ alkaryl, wherein the second group may include linear or branched alkyl moieties and which optionally are substituted with one or more groups selected from hydroxy, alkoxy, linear or branched polyalkyloxy, aryloxy, halogen, ester, ketone, carboxy, nitrile, and amido, and radicals of formulae II and III,

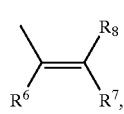

(II)

-continued

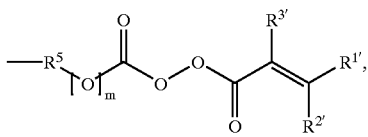

wherein
m=0 or 1,
$R^5$ is selected from $C_{1-20}$ alkylene, $C_{1-20}$ alkenylene, $C_2$–$C_{20}$ alkynylene, $C_3$–$C_{20}$ cycloalkylene, $C_3$–$C_{20}$ cycloalkenylene, $C_6$–$C_{20}$ arylene, $C_{7-20}$aralkylene, and $C_{7-20}$aralkenylene groups, which groups may include linear or branched alkyl moieties and all of which may optionally contain one or more hetero atoms, and wherein
$R^6$, $R^7$, $R^8$, and $R^{1'}$, $R^{2'}$, $R^{3'}$ are independently selected from the group consisting of compounds according to the definition of $R^1$, $R^2$, and $R^3$, respectively.

2. A process according to claim 1 wherein $R^1$, $R^2$, $R^3$ and/or $R^{1'}$, $R^{2'}$, $R^{3'}$ and/or $R^6$, $R^7$, and $R^8$ are selected such that one or more of the following moieties is formed:

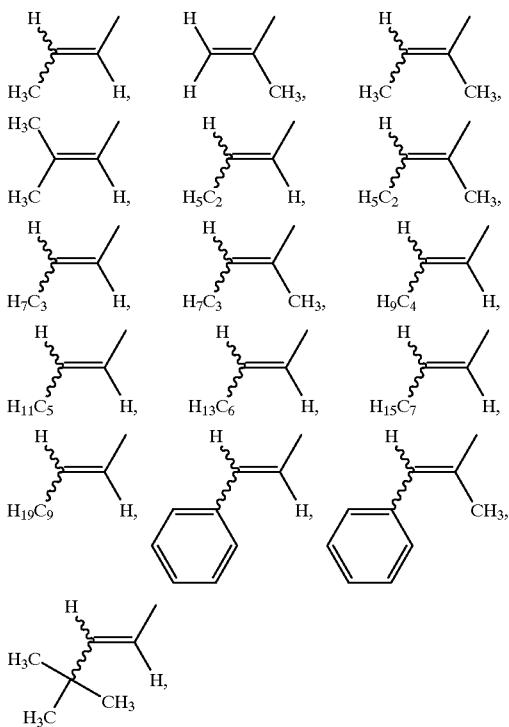

$H_3C$—CH=CH—CH=CH— (any isomer), and alkyl—O—CO—CH=CH— (any isomer).

3. A process according to claim 1 wherein $R^1$, $R^2$, $R^3$, $R^{1'}$, $R^{2'}$, $R^{3'}$, $R^6$, $R^7$, and $R^8$ are independently selected from the group consisting of hydrogen, methyl, ethyl, propyl, isopropyl, butyl, tert-butyl, pentyl, hexyl, heptyl, nonyl, and phenyl.

4. A process according to any one of claims 1–3 wherein $R^5$ is —C=C—C=C— when n and m are 0, or $C_{2-12}$ alkylene when both m and n are 1.

5. A process according to any one of claims 1–3 wherein the curing temperature is from 50 to 250° C.

6. A process according to any one of claims 1–3 wherein a silicone rubber is cured.

7. A process according to claim 6 wherein di(2-butenoyl) peroxide of formula

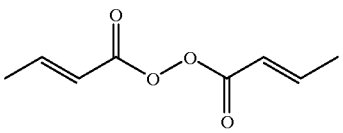

(any isomer, or mixture of isomers) and/or di(2-butenoylperoxy) hexylenedicarbonate of formula

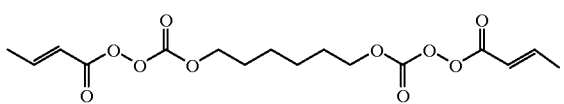

(any isomer, or mixture of isomers) are used.

8. A process according to claim 6 wherein the peroxide is combined with other conventional peroxides.

9. Cured silicone rubber obtainable by the process of claim 6.

10. A process according to any one of claims 1–3 wherein a conventional unsaturated polyester and/or vinyl ester resin is cured.

11. A process according to claim 10 wherein di-2-butenoyl peroxide (any isomer, or mixture of isomers) or di-3-methyl-2-butenoyl peroxide (any isomer, or mixture of isomers) is used.

12. A process according to claim 10 wherein only a peroxide of formula I is used as a source of free radicals.

13. Cured unsaturated polyester resin attainable by the process of claim 10.

* * * * *

UNITED STATES PATENT AND TRADEMARK OFFICE
CERTIFICATE OF CORRECTION

PATENT NO. : 6,608,146 B2
DATED : August 19, 2003
INVENTOR(S) : Jernej Jelenic, Charles Manuel Nvaarro and John Meijer It is certified that error appears in the above-identified patent and that said Letters Patent is hereby corrected as shown below:

Column 12,
Line 47, change "$R^{1-R2}$, $R^{1-R3}$, and $R^{2-R3}$" to -- $R^1\text{-}R^2$, $R^1\text{-}R^3$, and $R^2\text{-}R^3$ --

Signed and Sealed this

Twenty-eighth Day of October, 2003

JAMES E. ROGAN
*Director of the United States Patent and Trademark Office*